US011424706B2

(12) United States Patent
Li et al.

(10) Patent No.: US 11,424,706 B2
(45) Date of Patent: Aug. 23, 2022

(54) BATTERY CURRENT LIMITING OF PERMANENT MAGNET SYNCHRONOUS MOTOR DRIVES USING OPERATION CONDITION MONITORING

(71) Applicant: STEERING SOLUTIONS IP HOLDING CORPORATION, Saginaw, MI (US)

(72) Inventors: Haibo Li, Saginaw, MI (US); Prerit Pramod, Saginaw, MI (US); Krishna MPK Namburi, Saginaw, MI (US); Zhe Zhang, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 259 days.

(21) Appl. No.: 16/685,408

(22) Filed: Nov. 15, 2019

(65) Prior Publication Data

US 2021/0152112 A1    May 20, 2021

(51) Int. Cl.
| | |
|---|---|
| *H02P 21/22* | (2016.01) |
| *H02P 6/28* | (2016.01) |
| *H02P 21/14* | (2016.01) |
| *B62D 5/04* | (2006.01) |

(52) U.S. Cl.
CPC ............ *H02P 21/22* (2016.02); *B62D 5/0463* (2013.01); *B62D 5/0409* (2013.01); *B62D 5/0454* (2013.01)

(58) Field of Classification Search
CPC .. H02P 21/22; H02P 2207/05; H02P 21/0089; H02P 6/28; H02P 21/14; H02P 23/009; B62D 5/0463; B62D 5/046
See application file for complete search history.

(56) References Cited

U.S. PATENT DOCUMENTS

| | | | | |
|---|---|---|---|---|
| 9,531,311 | B2* | 12/2016 | Collier-Hallman | H02P 21/22 |
| 2002/0145837 | A1* | 10/2002 | Krefta | H02P 21/08 |
| | | | | 361/23 |
| 2008/0303475 | A1* | 12/2008 | Patel | H02P 21/141 |
| | | | | 318/634 |
| 2010/0277111 | A1* | 11/2010 | Kitanaka | H02P 27/06 |
| | | | | 318/400.02 |
| 2011/0175558 | A1* | 7/2011 | Kitanaka | B60L 15/20 |
| | | | | 318/400.3 |
| 2012/0217916 | A1* | 8/2012 | Wu | H02P 21/0089 |
| | | | | 318/400.11 |
| 2013/0009574 | A1* | 1/2013 | Yoo | H02P 21/22 |
| | | | | 318/400.02 |

(Continued)

*Primary Examiner* — Thai T Dinh
(74) *Attorney, Agent, or Firm* — Dickinson Wright PLLC

(57) ABSTRACT

Technical solutions are described for controlling operation of an electric machine such as a permanent magnet synchronous motor (PMSM) drive or motor control system to limit battery current and protect a battery from excessive discharging or charging current from the PMSM drive. Systems and methods employ a torque control algorithm for PMSMs that uses a battery current limit constraint when generating current commands during each of a maximum torque per ampere (MTPA) operation, and maximum torque per voltage (MTPV) operation. Torque search operations are performed in each of the MTPA and MTPV operation regions in a PMSM drive system until current commands are achieved under a given battery current limit constraint and while maintaining maximum voltage utilization throughout all PMSM operation regions.

18 Claims, 4 Drawing Sheets

(56) References Cited

U.S. PATENT DOCUMENTS

| | | | |
|---|---|---|---|
| 2014/0265951 A1* | 9/2014 | Gebregergis | H02P 21/22 |
| | | | 318/400.02 |
| 2016/0114801 A1* | 4/2016 | Park | H02P 21/06 |
| | | | 701/22 |
| 2017/0085200 A1* | 3/2017 | Campbell | H02P 21/22 |
| 2017/0317635 A1* | 11/2017 | Campbell | H02P 21/02 |
| 2017/0331403 A1* | 11/2017 | Irie | H02P 21/0003 |

* cited by examiner

BATTERY CURRENT LIMITING OF PERMANENT MAGNET SYNCHRONOUS MOTOR DRIVES USING OPERATION CONDITION MONITORING

BACKGROUND

The present application is generally related to methods and systems for controlling operation of an electric machine such as a permanent magnet synchronous motor (PMSM) drive or motor control system. More specifically, the present application is related to methods and systems for limiting battery current in a PMSM drive to protect a battery from excessive discharging or charging current from the PMSM drive. Example embodiments are provided in electric power steering (EPS) systems.

Modern electric power steering (EPS) systems employ permanent magnet synchronous motors (PMSM) based electric drives that provide torque assistance to the driver. A vehicle battery is commonly used as a power source for EPS systems. Since multiple electronic systems in the vehicle consume power from the vehicle battery, it is essential for each system to actively manage the power (or current) it draws from or supplies back to the battery. With the advent and proliferation of electric vehicles, it is now even more critical to protect the battery through proper management of currents and voltages.

SUMMARY

According to one or more example embodiments, a motor control system, a method, and a system comprising a PMSM and a motor control system, are provided that are each configured to limit supply current and regenerative current, by determining a torque command that is limited to within a maximum torque of a motor; performing a maximum torque per ampere (MTPA) calculation using the torque command to determine current commands for motor control; and generating an estimated battery current value for the system. The MTPA calculation determines a reduced torque command when an estimated battery current value for the system exceeds a designated battery current limit value.

In accordance with an aspect of the example embodiments, the MTPA calculation is repeated using the reduced torque command to determine updated current commands.

In accordance with an aspect of the example embodiments, a motor control system, a method, and a system comprising a PMSM and a motor control system, are provided that are configured to iteratively determine a reduced torque command and perform the MTPA calculation using the reduced torque command to determine updated current commands until the designated battery current limit value is met.

In accordance with an aspect of the example embodiments, a motor control system, a method, and a system comprising a PMSM and a motor control system, are provided that are configured to perform a maximum torque per voltage (MTPV) module to determine if a motor voltage exceeds a designated maximum DC link voltage; and determine updated current commands when the motor voltage does not exceed the designated maximum DC link voltage.

In accordance with an aspect of the example embodiments, the MTPV calculation uses the current commands from the MTPA calculation to determine the updated current commands for motor control wherein an estimated battery current value for the system does not exceed the designated battery current limit value.

In accordance with an aspect of the example embodiments, when the MTPV calculation determines that motor voltage exceeds the designated maximum DC link voltage, a MTPV calculation is iteratively performed to determine a modified torque command that satisfies both a battery current limit condition and a maximum voltage utilization condition and update the current commands. The battery current limit condition is met when an estimated battery current value for the system does not exceed the designated battery current limit value, and the maximum voltage utilization condition is met when the MTPV calculation determines updated current commands for PMSM control that produce a maximized torque command when the PMSM voltage is substantially equal to the designated maximum DC link voltage.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Permanent magnet synchronous machines or motor (PMSM) drives are gaining more and more applications because of their superior properties, including high power density, precise controllability and good reliability. The PMSM torque control is achieved through feedback current control which usually adopts current and position measurements. Among various control strategies, Field Oriented Control (FOC) is the most commonly used technique for current control, in which all AC signals are transformed into DC signals via a reference frame transformation. The control system is then implemented in the synchronously rotating or d/q reference frame.

To protect the voltage source of an electric drive (or motor control) system, which in the case of automotive applications is a vehicle battery, and enhance overall system reliability, a voltage versus battery current limit is typically imposed. These limits may be in the form of a table calibrated offline or an online continuously changing limit that is sent to the motor control system. Under the constraint of this battery current limit, the motor current commands must be modified to ensure that the electric drive (or motor control) system does not draw any more supply current or does not feed more regenerative charging current than specified, so that the battery is protected.

Figure 1:
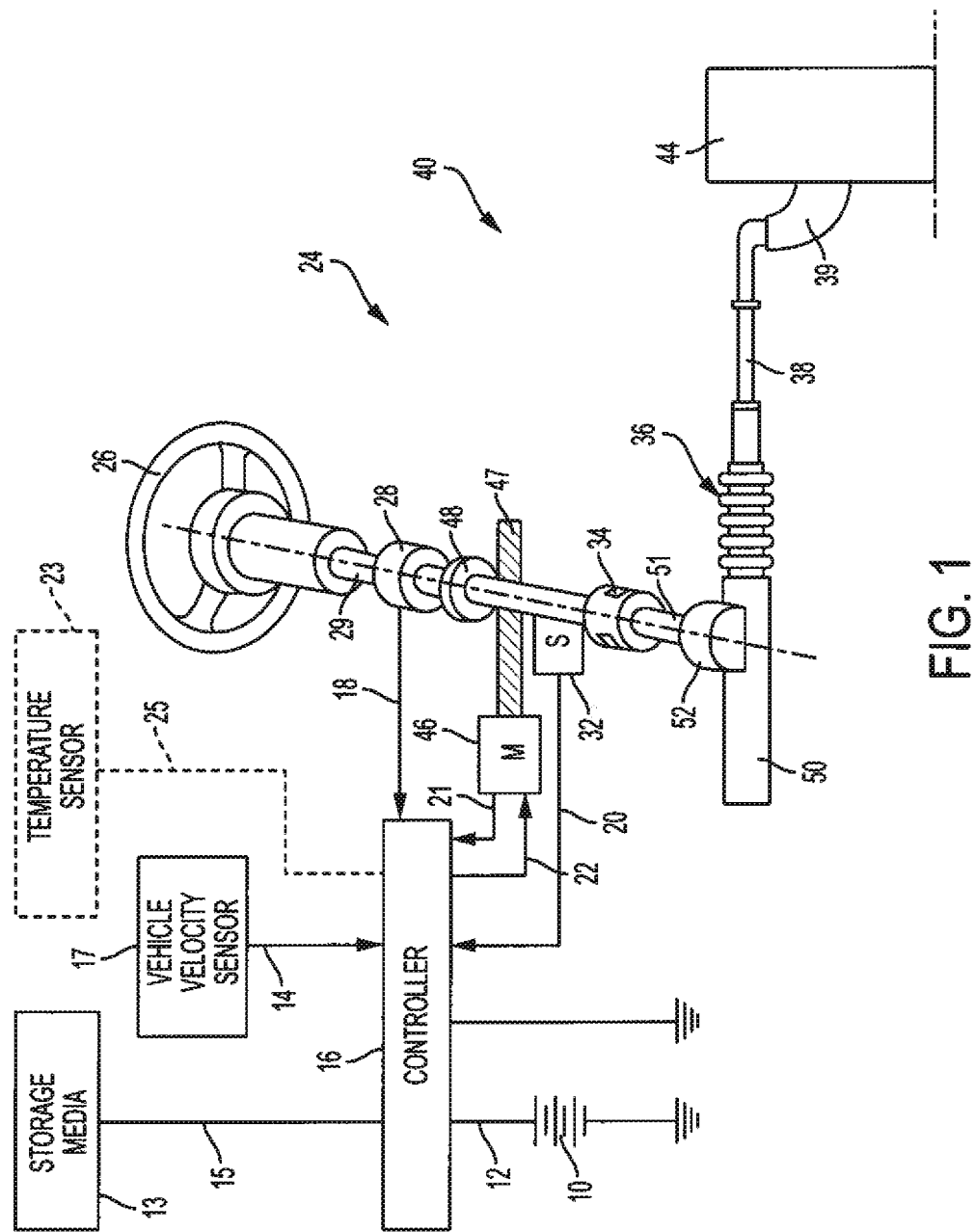
FIG. 1 depicts a block diagram of an example embodiment of an EPS system according to aspects of the present disclosure.
Figure 2:
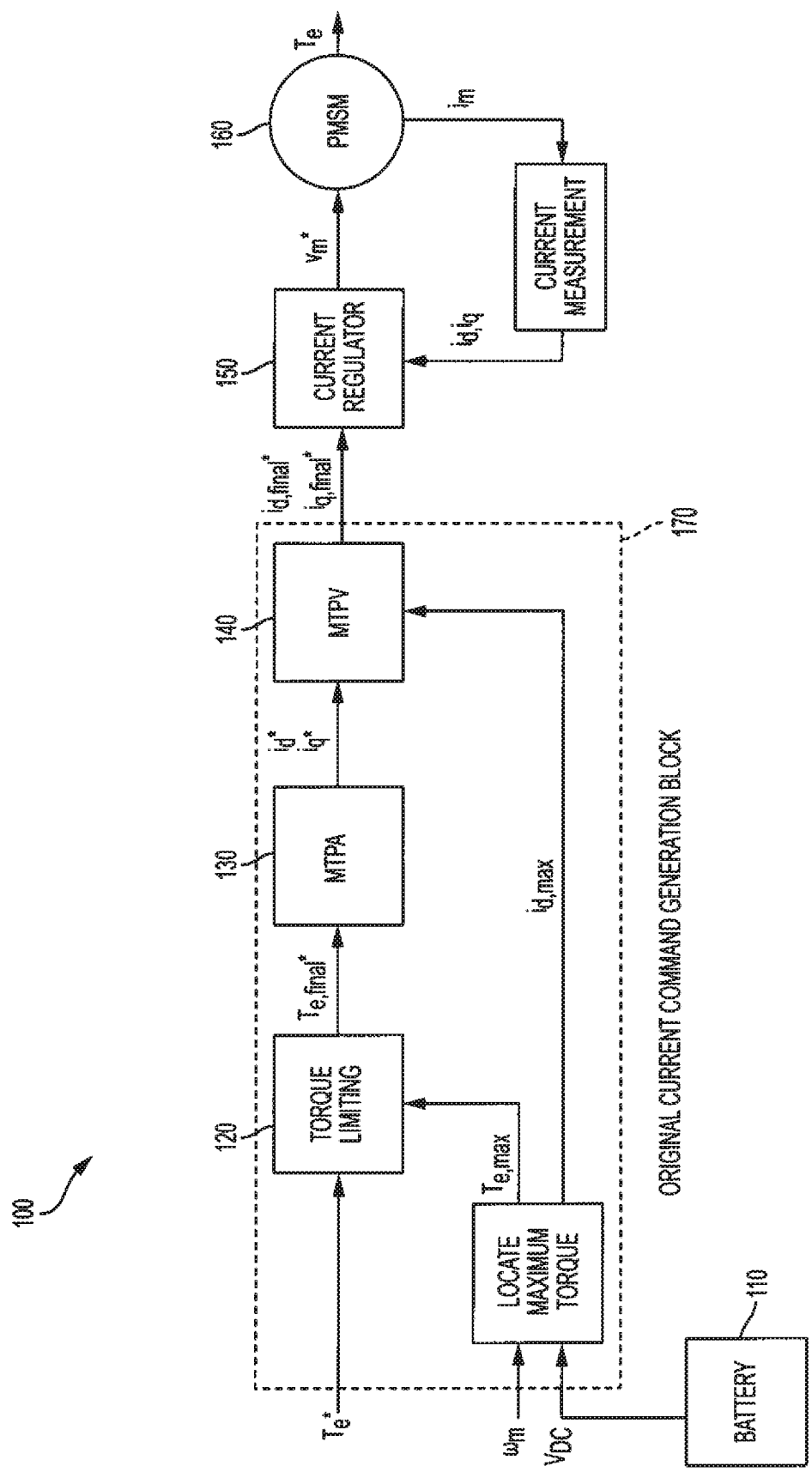
FIG. 2 depicts a block diagram of an example torque control algorithm for PMSMs according to aspects of the present disclosure.
Figure 3:
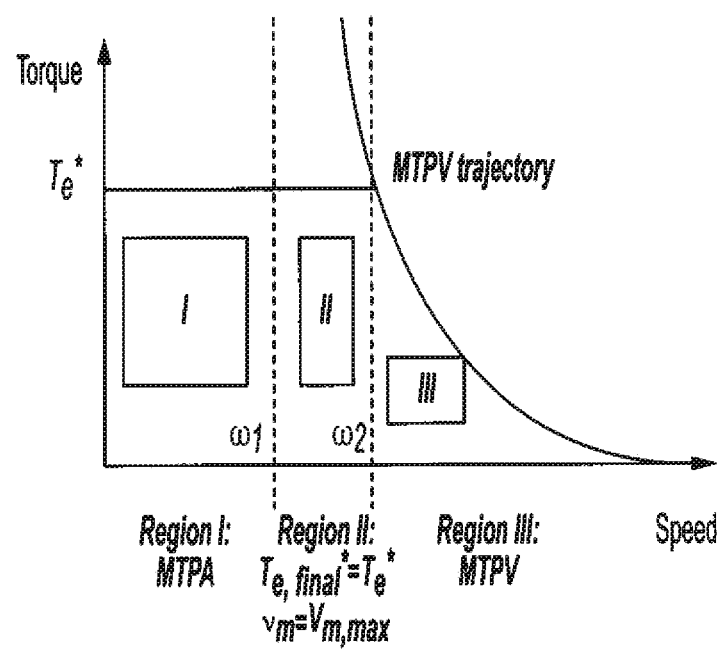
FIG. 3 depicts operation regions in a PMSM drive.
Figure 4:
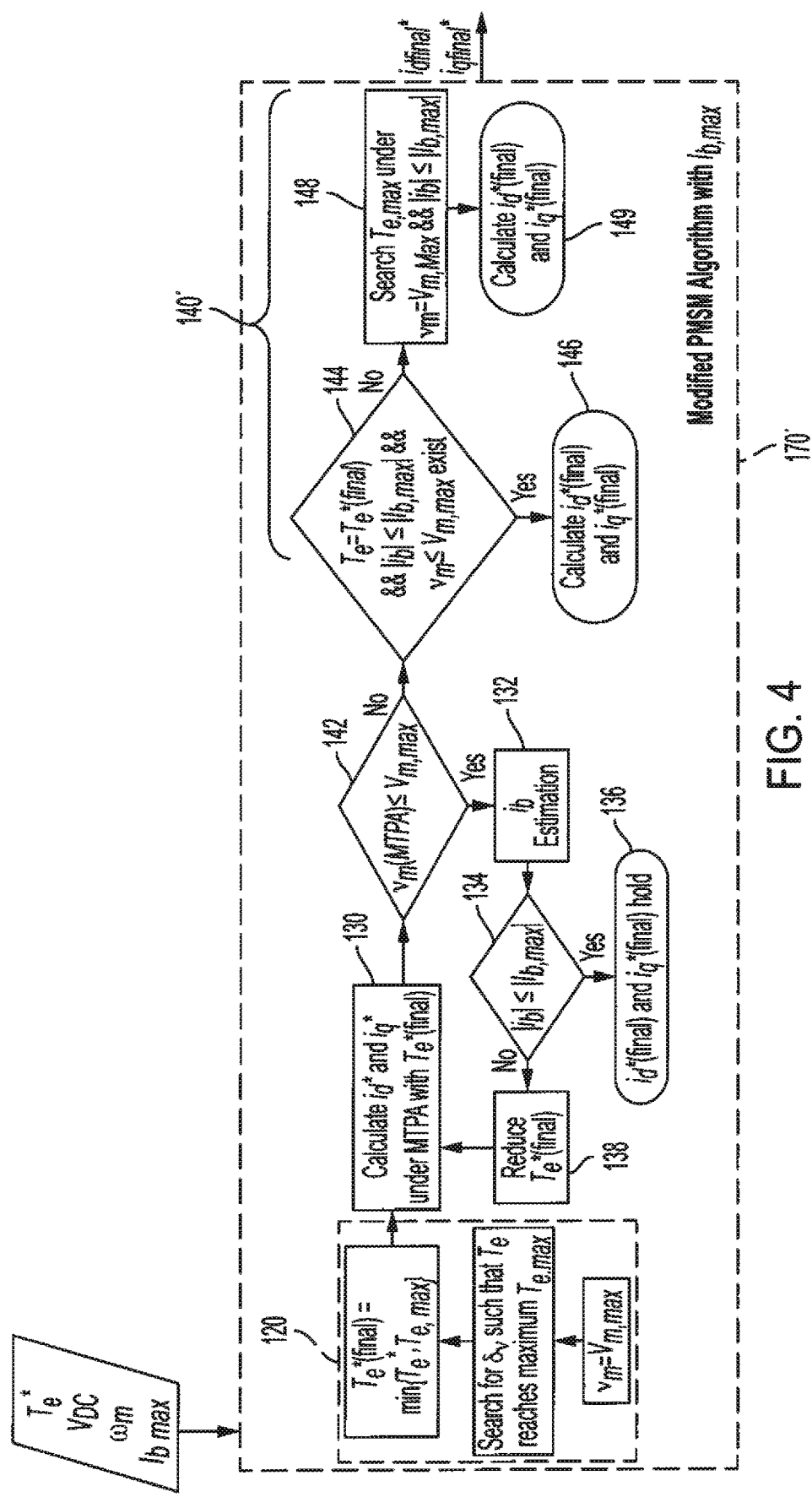
FIG. 4 depicts a block diagram of an example improved torque control algorithm for PMSMs according to aspects of the present disclosure.

An example EPS system and a torque control algorithm for a PMSM drive are described herein with reference to FIGS. 1 and 2, followed by a description of example embodiments of an improved torque control algorithm for a PMSM drive with reference to FIGS. 3 and 4. The improved torque control algorithm actively limits battery current in a PMSM drive by restricting the battery current draw through active torque command modification, while also ensuring maximum voltage utilization. The battery current limiting is translated to equivalent PMSM torque limiting by modifying the current commands generation algorithm in the system, and is implemented by online torque command modification according to maximum allowable torque under battery current limit constraint. The improved torque control algorithm therefore protects the battery from excessive discharging or charging current in all operation regions of the PMSM drive system as described with FIG. 3. The improved torque control algorithm is applicable to all electric drive systems employing PMSMs and is not restricted to any specific application.

Referring now to the figures, where the technical solutions will be described with reference to specific embodiments, without limiting same, FIG. 1 is an exemplary embodiment of an electric power steering system (EPS) 40 suitable for implementation of the disclosed embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\Theta/\Delta t$ where $\Delta t$ is the sampling time and $\Delta\Theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position anchor speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The motor position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In one or more examples, the technical solutions described herein facilitate power management of the electric drive portion of the EPS system, i.e. the motor control system. It should be noted that although the technical solutions are described herein using embodiments of steering system, the technical solutions are applicable to any other motor control system that is used in any other PMSM.

In a motor control system, in order to protect a voltage source of the electric drive (motor control) system, a voltage versus supply and/or regenerative current limit is typically imposed. These limits may be in the form of a table calibrated offline or an online continuously changing limit that is sent to the motor control system. Given this supply and/or regenerative current limit, the motor current command is modified to ensure that the system does not draw any more supply current or does not feed more regenerative current than specified, so that the power supply is protected. In specific examples of a motor control system being used in the case of automotive applications, such as a steering system, the power supply is a vehicle battery.

FIG. 2 depicts a block diagram of an example torque control algorithm for PMSMs. The block diagram depicts a motor control system 100 in which for a given DC link voltage $V_{DC}$, which is derived from a battery 110, and a motor (mechanical) speed $\omega_m$, the maximum torque $T_{e,max}$ is calculated and then compared to a given torque command $T^*_e$ to generate a final torque command $T^*_{e,final}$ within the system capability by a torque limiting module 120. The motor control system 100 thus facilitates motor torque control and motor current control. The $T^*_{e,final}$ is sent to a maximum torque per ampere (MTPA) module 130 to calculate current commands $i^*_d$ and $i^*_q$, which are sent into a maximum torque per voltage (MTPV) module 140 to check if the corresponding PMSM voltage $v_m$ exceeds the maximum feasible value equal to the DC link voltage $V_{DC}$. If the PMSM voltage $v_m$ does not exceed $v_m = V_{m,max}$, current commands calculated by the MTPA module 130 are used as final commands $i^*_{d,final}$ and $i^*_{q,final}$ for PMSM control; otherwise, different commands $i^*_{d,final}$ and $i^*_{q,final}$ are generated by the MTPV block 140 to meet the PMSM voltage constraint. The final current commands are then sent to a current regulator 150, which ensures current tracking, and thus torque tracking. Here, 'tracking' refers to how close the output current (or torque) is to the desired current (or torque) as requested by the current command (torque command).

To protect the battery 110 from being over discharged or charged by excessive current and thereby extend the battery life, battery current limiting is performed during operation of the PMSM 160. The PMSM 160 may be the motor 46 used in the steering system 40, or any other application. As described earlier, typically look-up tables (LUT) are used to adjust the torque and current commands so that the battery current does not exceed the maximum value. A technical challenge with such an approach is that an offline calibration has to be performed for different motors and is time-consuming. Further, due to the offline nature of these techniques, the current and torque commands are not optimal since dynamically changing operation conditions of the PMSM 160 are not considered. The technical solutions described herein facilitate battery current limiting that has the capability to limit both battery supply current and regenerative charging currents at the same time, can be implemented when the PMSM 160 is online, with good accuracy throughout the entire operating regions of the PMSM 160, and further ensures full DC link voltage utilization. The technical solutions are described further.

In accordance with example embodiments, an improved torque control algorithm for a PMSM drive is provided which actively limits the battery current and which benefits from PMSM operation modes analysis. FIG. 3 depicts PMSM operation modes. There are basically two operation regions in a PMSM drive system, i.e., MTPA and MTPV, which are denoted as region I and region III respectively in FIG. 3. The current commands in these two different regions are generated with MTPA and MTPV techniques or operations, respectively, to achieve optimal current trajectory and hence optimal motor control. Essentially, the MTPA operation is to determine the dq current commands $i^*_d$ and $i^*_q$ such that the torque command $T^*_e$ is produced with the minimum machine current. The MTPA operation is highly desired in a PMSM drive system because the torque command is tracked and meanwhile the minimum machine current is maintained, which minimizes the machine losses. However, with the extension of MTPA trajectory, the MTPA operation finally becomes not feasible due to the fact that the voltage capability, which is determined by DC-link voltage, will be reached. The increase of either given torque command or motor speed will contribute to a higher PMSM voltage and accelerate the approaching to voltage capability. The MTPV operation determines the current commands in the voltage saturated region, i.e., when the voltage command magnitude is equal to the maximum voltage, such that the current commands produce torque that is as close as possible to the requested torque command to ensure optimal current trajectory. Both MTPA and MTPV techniques or operations utilize parameter estimation results, along with the machine model considering nonlinearities, to determine the current commands online.

Besides Region I and III, there is also a transition region in between, denoted as region II in FIG. 3, where $T^*_{e,final}=T^*_e$ and $v_m=V_{m,max}$. Flux-weakening is performed in this region to keep the machine voltage within $V_{m,max}$ while the final torque command is kept the same as original.

According to example embodiments, the improved torque control algorithm for a PMSM drive employs a battery current limit constraint $I_{b,max}$ when generating current commands $i^*_{d,final}$ and $i^*_{q,final}$ during each of the maximum torque per ampere (MTPA) operation, and the maximum torque per voltage (MTPV) operation. Torque search operations are performed in each of the MTPA and MTPV operation regions in a PMSM drive until current commands are achieved under a given battery current limit constraint and while maintaining maximum voltage utilization throughout PMSM drive operation.

In accordance with aspects of example embodiments of the improved torque control algorithm, if a battery current limit $I_{b,max}$ is to be considered as PMSM control constraint in the original motor control algorithm 170 illustrated in FIG. 2, the torque command needs to be modified accordingly. The challenge exists in that the maximum allowable torque to prevent battery current exceeding its limit is unknown and is difficult to obtain analytically due to the complexity of MTPA and MTPV techniques in maintaining optimal current trajectory. A technical solution to this problem is provided by an improved torque control algorithm 170' illustrated in FIG. 4. In accordance with the improved torque control algorithm 170', a PMSM operation region-based battery current limiting method is implemented to reduce the analytical complexity of maximum torque calculation under given battery current limit.

The battery current limiting method based on PMSM operation regions is achieved by modifying the original PMSM algorithm 170 with consideration of battery current limit constraint, as shown in the improved torque control algorithm 170' of FIG. 4, to generate current commands $i^*_{d,final}$ and $i^*_{q,final}$ that will ensure battery current under the pre-defined limit. Specifically, in the MTPA operation region, the improved torque control algorithm 170' achieves battery current limiting by iteratively running the MTPA calculation 130' and updating torque command until battery current limit constraint is met. For example, a battery current $i_b$ is estimated (block 132) by a processing device performing the improved torque control algorithm 170' (e.g., controller 16), The MTPA operation 130' is configured to determine a reduced torque command $T^*_{e,final}$ (block 138) for determining updated current commands $i^*_d$ and $i^*_q$ when the estimated battery current $i_b$ exceeds a designated battery current limit $I_{b,max}$ (negative branch of decision block 134); otherwise, the most recent current commands $i^*_{d,final}$ and $i^*_{q,final}$ (block 136) are provided to the current regulator 150 (block 136). The MTPA operation 130' is configured to iteratively determine a reduced torque command and perform the MTPA operation using the reduced torque command $T^*_{e,final}$ to determine updated current commands $i^*_d$ and $i^*_q$ until the designated battery current limit $I_{b,max}$ is met.

Outside MTPA region, the improved torque control algorithm 170' modifies the MTPV operation 140 (as indicated by MTPV operation 140') such that searching of maximum torque under constraints of both battery current limit and voltage capability is performed to find the current commands that will produce a torque $T^*_{e,final}$ or a maximum torque as close to $T^*_{e,final}$ as possible if $T^*_{e,final}$ cannot be reached. For example, the MTPV operation 140' is performed by a processing device (e.g., controller 16) and employs the current commands $i^*_d$ and $i^*_q$ from the MTPA operation 130'. The MTPV operation 140' determines if a motor voltage $v_m$ exceeds a designated maximum DC link voltage $V_{m,max}$ (block 142) and, if not, calculates current commands $i^*_{d,final}$ and $i^*_{q,final}$ (block 146). As explained above, the MTPV operation 140' also advantageously takes into consideration that estimated battery current value for the system does not exceed the designated battery current limit value.

The MTPV operation 140' determines that motor voltage $v_m$ exceeds the designated maximum DC link voltage $V_{m,max}$, the MTPV operation 140' iteratively performs a MTPV calculation to determine a modified torque command (block 148) that satisfies both a battery current limit condition and a maximum voltage utilization condition and update the current commands (block 149). For example, battery current limit condition is met when an estimated battery current value for the system does not exceed the designated battery current limit value, and the maximum voltage utilization condition is met when the MTPV calculation determines updated current commands for PMSM control that produce a maximized torque command when the PMSM voltage is substantially equal to the designated maximum DC link voltage.

The improved torque control algorithm 170' described herein in accordance with illustrative embodiments, such as the method described in connection with FIG. 4, effectively limits the battery current under a given battery current limit constraint, and is ensures maximum voltage utilization throughout all PMSM operation regions. The improved torque control algorithm 170' improves battery current management by performing PMSM operation region-based battery current limiting and therefore significantly reduces complexity. The improved torque control algorithm 170' considers dynamic variation of operating conditions through online limiting capability, and is applicable for all permanent magnet synchronous machines under all conditions.

The improved torque control algorithm 170' provides a significant improvement over existing techniques for battery current management, which are calibrated offline and are tuning intensive. Further, existing techniques for battery current management do not consider varying operating conditions. Existing dynamic techniques that iteratively modify the motor torque command are accurate, but computationally complex for implementation. By contrast, the improved torque control algorithm 170'can dynamically limit the supply and regenerative (battery) current, and considers dynamically varying operating conditions of the electric machine, including temperature variation and magnetic saturation. The improved torque control algorithm 170' is also computationally efficient because individual PMSM operation regions are used for implementing the torque search algorithms. Further, the improved torque control algorithm 170 does not allow PMSM operation region switching within each control loop.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A motor control system configured to limit supply current and regenerative current, the motor control system comprising:
   a torque limiting module configured to determine a torque command that is limited to within a maximum torque of a motor;
   a maximum torque per ampere (MTPA) module configured to perform a MTPA calculation using the torque command to determine current commands for control of the motor; and
   a battery current estimation and comparison module for generating an estimated battery current value for the system;
   wherein the MTPA module is configured to determine a reduced torque command when an estimated battery current value for the system exceeds a designated battery current limit value and motor voltage does not exceed a designated maximum DC link voltage.

2. The system of claim 1, wherein the MTPA module is further configured to repeat the MTPA calculation using the reduced torque command to determine updated current commands.

3. The system of claim 2, wherein the MTPA module is further configured to iteratively determine a reduced torque command and perform the MTPA calculation using the reduced torque command to determine updated current commands until the designated battery current limit value is met.

4. The system of claim 1, wherein the motor control system further comprises a maximum torque per voltage (MTPV) module configured to:
   determine when a motor voltage does not exceed a designated maximum DC link voltage; and
   determine updated current commands when the motor voltage does not exceed the designated maximum DC link voltage.

5. The system of claim 4, wherein the MTPV module is configured perform a MTPV calculation using the current commands from the MTPA calculation to determine the updated current commands for control of the motor wherein an estimated battery current value for the system does not exceed the designated battery current limit value.

6. The system of claim 4, wherein, when the MTPV calculation determines that motor voltage exceeds the designated maximum DC link voltage, the MTPV module is further configured to:
   iteratively perform a MTPV calculation to determine a modified torque command that satisfies both a battery current limit condition and a maximum voltage utilization condition and update the current commands,
   wherein battery current limit condition is met when an estimated battery current value for the system does not exceed the designated battery current limit value, and
   wherein the maximum voltage utilization condition is met when the MTPV calculation determines updated current commands for permanent magnet synchronous machine (PMSM) control that produce a maximized torque command when the PMSM voltage is substantially equal to the designated maximum DC link voltage.

7. A system comprising:
   a permanent magnet synchronous machine (PMSM); and
   a motor control system configured to limit supply current and regenerative current, the motor control system being configured to:

determine a torque command that is limited to within a maximum torque of the PMSM;

perform a maximum torque per ampere (MTPA) calculation using the torque command to determine current commands for control of the PMSM; and when an estimated battery current value for the system exceeds a designated battery current limit value and motor voltage does not exceed a designated maximum DC link voltage, perform the MTPA calculation to determine a reduced torque command.

8. The system of claim 7, wherein the motor control system is further configured to repeat the MTPA calculation using the reduced torque command to determine updated current commands.

9. The system of claim 8, wherein the motor control system is further configured to iteratively determine a reduced torque command and perform the MTPA calculation using the reduced torque command to determine updated current commands until the designated battery current limit value is met.

10. The system of claim 7, wherein the motor control system is further configured to:

determine when a PMSM voltage does not exceed a designated maximum DC link voltage of the system; and determine updated current commands for control of the PMSM when the PMSM voltage does not exceed the designated maximum DC link voltage.

11. The system of claim 10, wherein the motor control system is further configured perform a MTPV calculation using the current commands from the MTPA calculation to determine the updated current commands for control of the PMSM wherein an estimated battery current value for the system does not exceed the designated battery current limit value.

12. The system of claim 10, wherein, when the MTPV calculation determines that PMSM voltage exceeds the designated maximum DC link voltage, the motor control system is further configured to:

iteratively perform a MTPV calculation to determine a modified torque command that satisfies both a battery current limit condition and a maximum voltage utilization condition, wherein battery current limit condition is met when an estimated battery current value for the system does not exceed the designated battery current limit value, and wherein the maximum voltage utilization condition is met when the MTPV calculation determines updated current commands for PMSM control that produce a maximized torque command when the PMSM voltage is substantially equal to the designated maximum DC link voltage.

13. The method of claim 12, further comprising repeating the MTPA calculation using the reduced torque command to determine updated current commands.

14. The method of claim 13, further comprising iteratively determining a reduced torque command and performing the MTPA calculation using the reduced torque command to determine updated current commands until the designated battery current limit value is met.

15. A method of limiting supply current and regenerative current, the method comprising:

determining a torque command that is limited to within a maximum torque of a motor;

performing a maximum torque per ampere (MTPA) calculation using the torque command to determine current commands for motor control; and generating an estimated battery current value for the system;

wherein the MTPA calculation determines a reduced torque command when an estimated battery current value for the system exceeds a designated battery current limit value and motor voltage does not exceed a designated maximum DC link voltage.

16. The method of claim 15, further comprising performing a maximum torque per voltage (MTPV) module to:

determine when a motor voltage exceeds a designated maximum DC link voltage; and determine updated current commands when the motor voltage does not exceed the designated maximum DC link voltage.

17. The method of claim 16, wherein the MTPV calculation uses the current commands from the MTPA calculation to determine the updated current commands for motor control wherein an estimated battery current value for the system does not exceed the designated battery current limit value.

18. The method of claim 16, wherein, when the MTPV calculation determines that motor voltage exceeds the designated maximum DC link voltage, the method further comprises:

iteratively performing a MTPV calculation to determine a modified torque command that satisfies both a battery current limit condition and a maximum voltage utilization condition and update the current commands, wherein battery current limit condition is met when an estimated battery current value for the system does not exceed the designated battery current limit value, and herein the maximum voltage utilization condition is met when the MTPV calculation determines updated current commands for PMSM control that produce a maximized torque command when the PMSM voltage is substantially equal to the designated maximum DC link voltage.

* * * * *